Nov. 21, 1961   R. A. MAHAFFY ET AL   3,009,299
AUTOMATIC SWITCHING AND STORAGE CONVEYOR
Filed Sept. 2, 1958   19 Sheets-Sheet 16

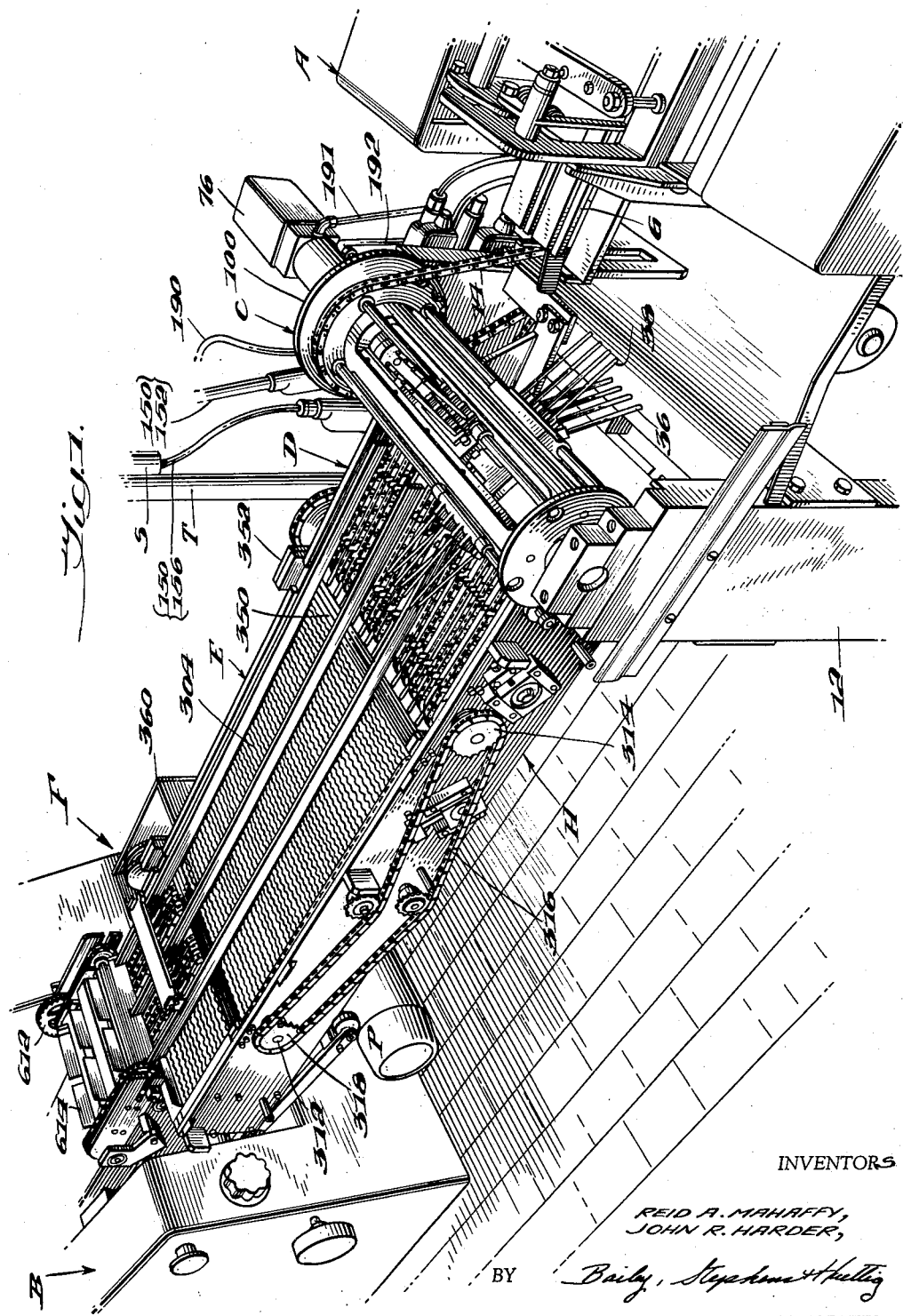

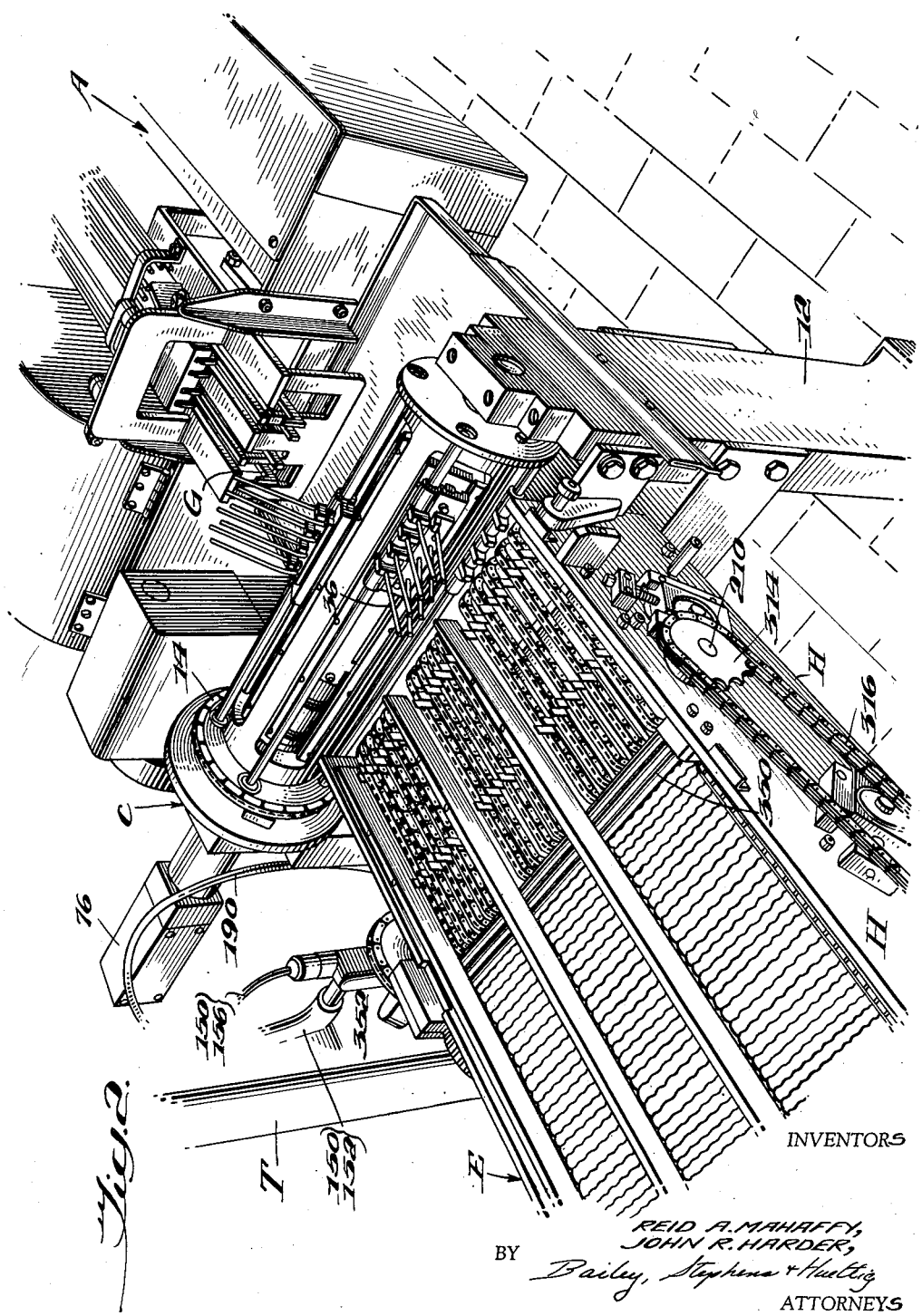

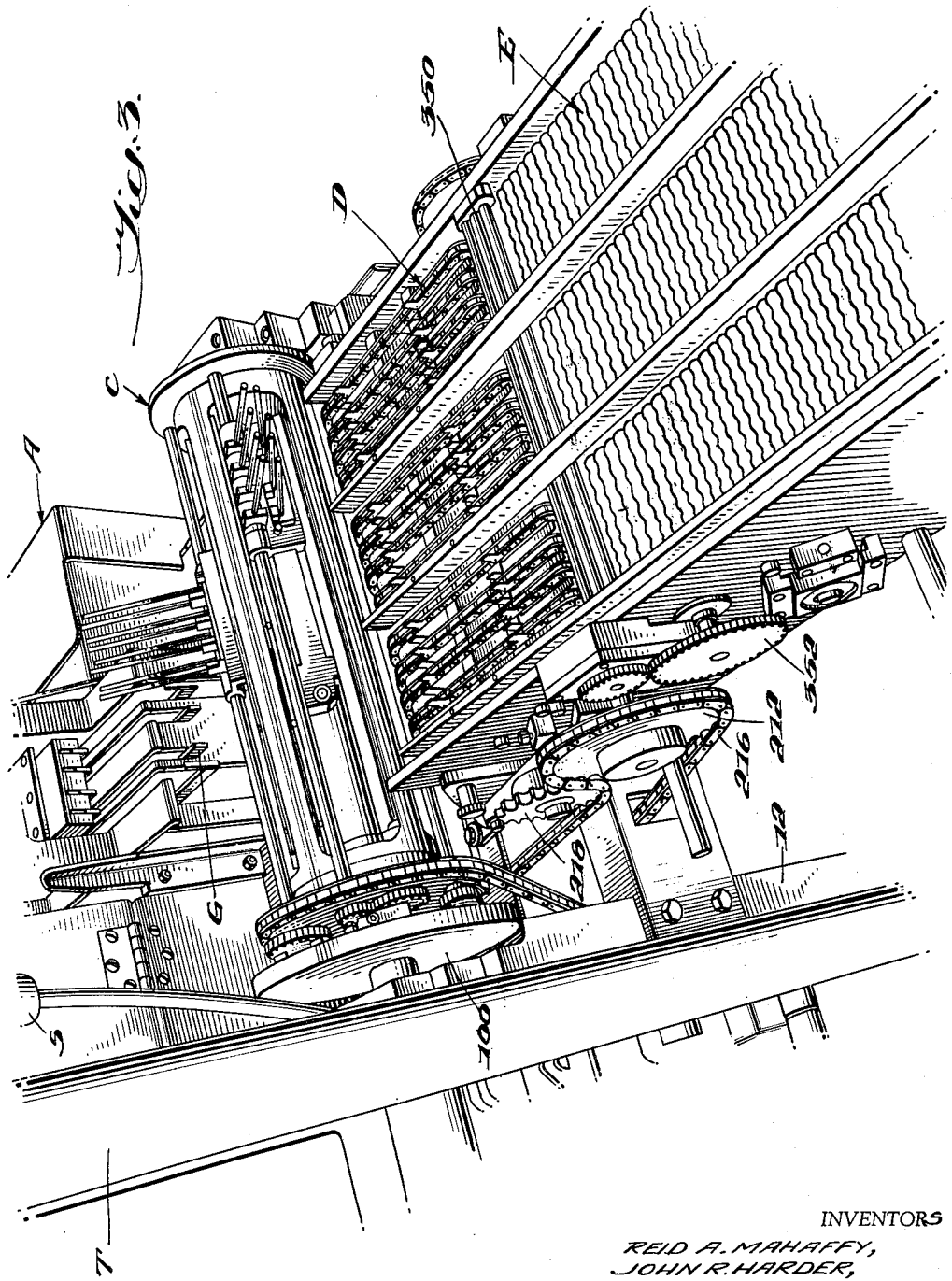

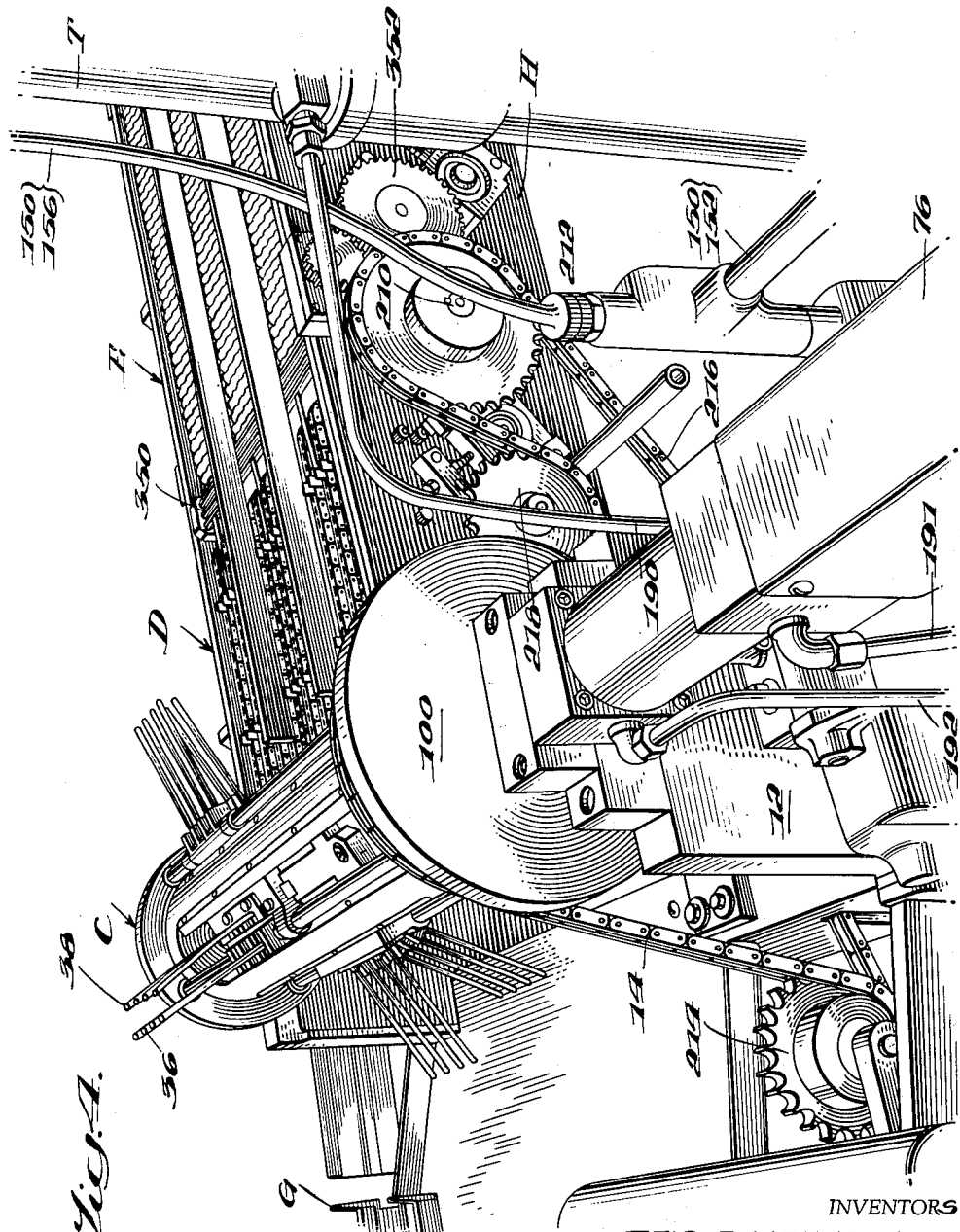

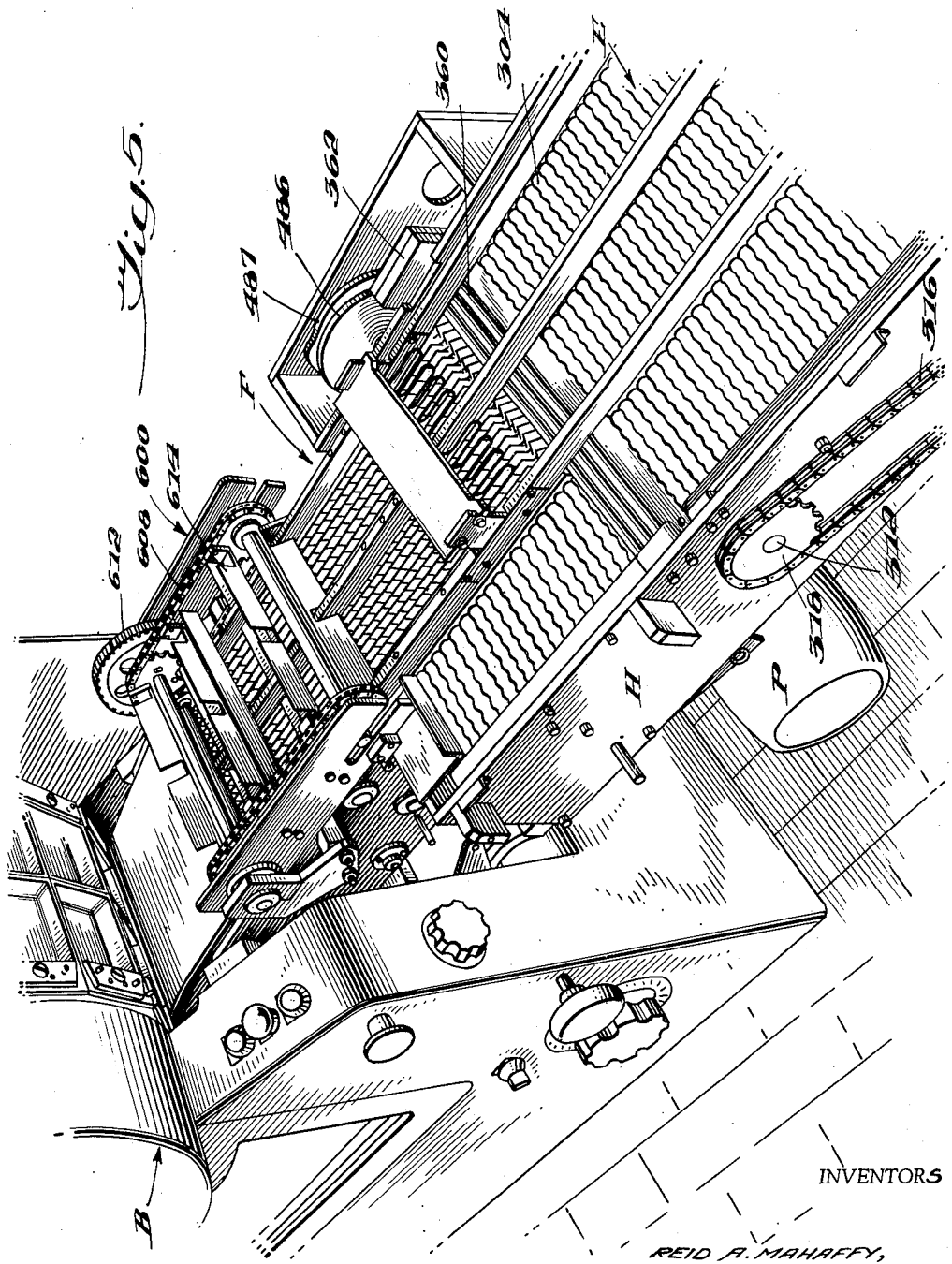

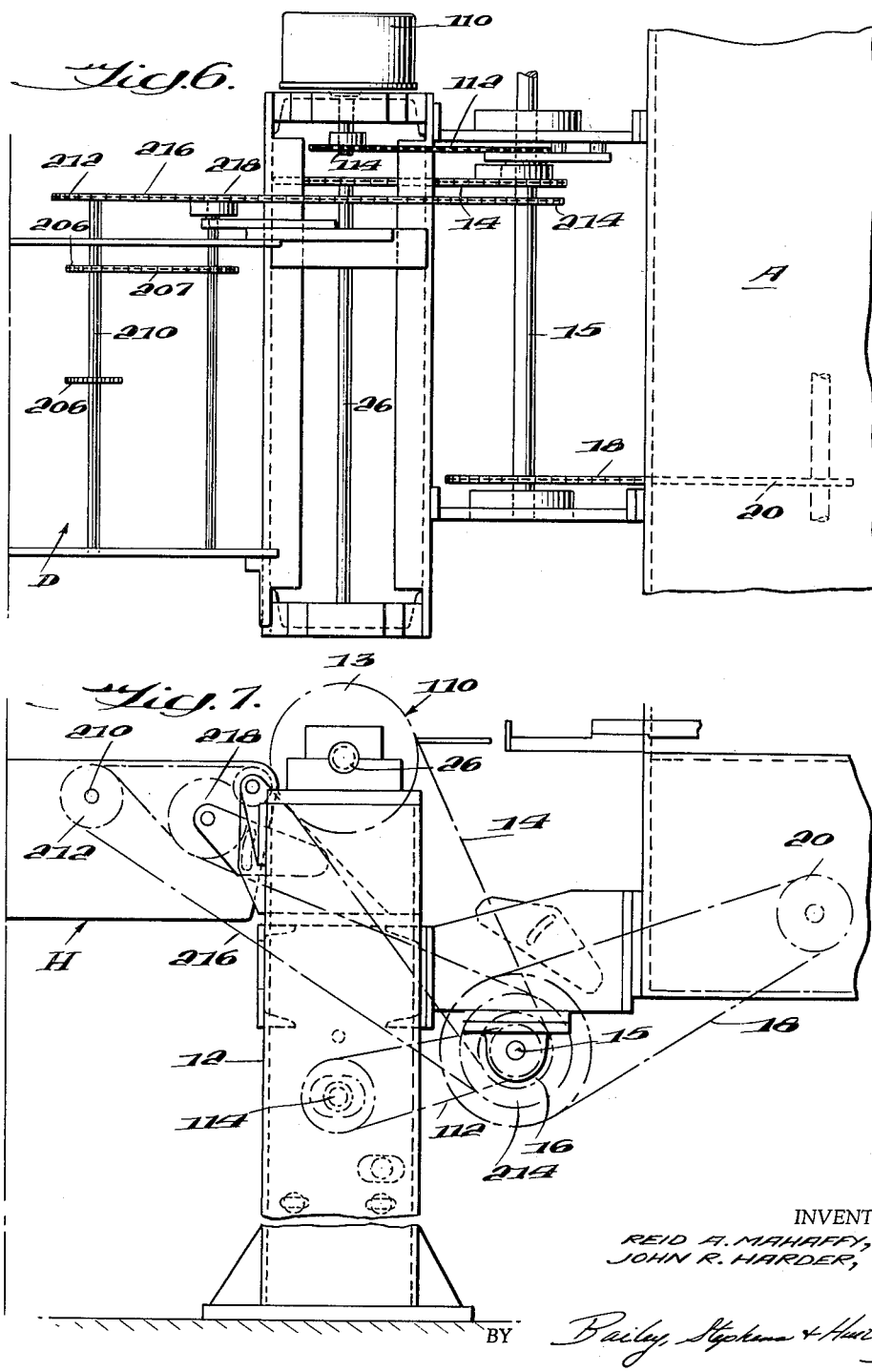

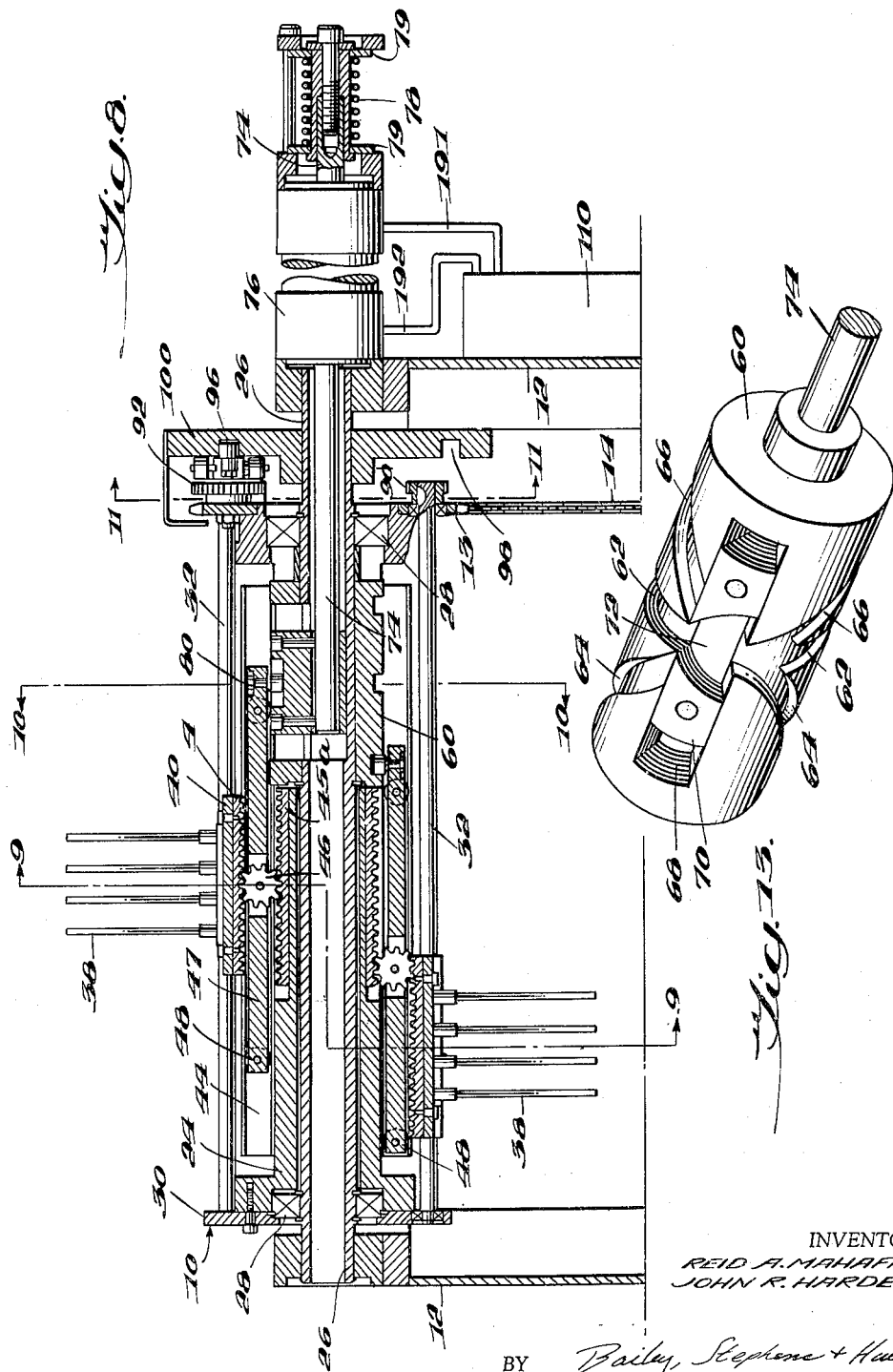

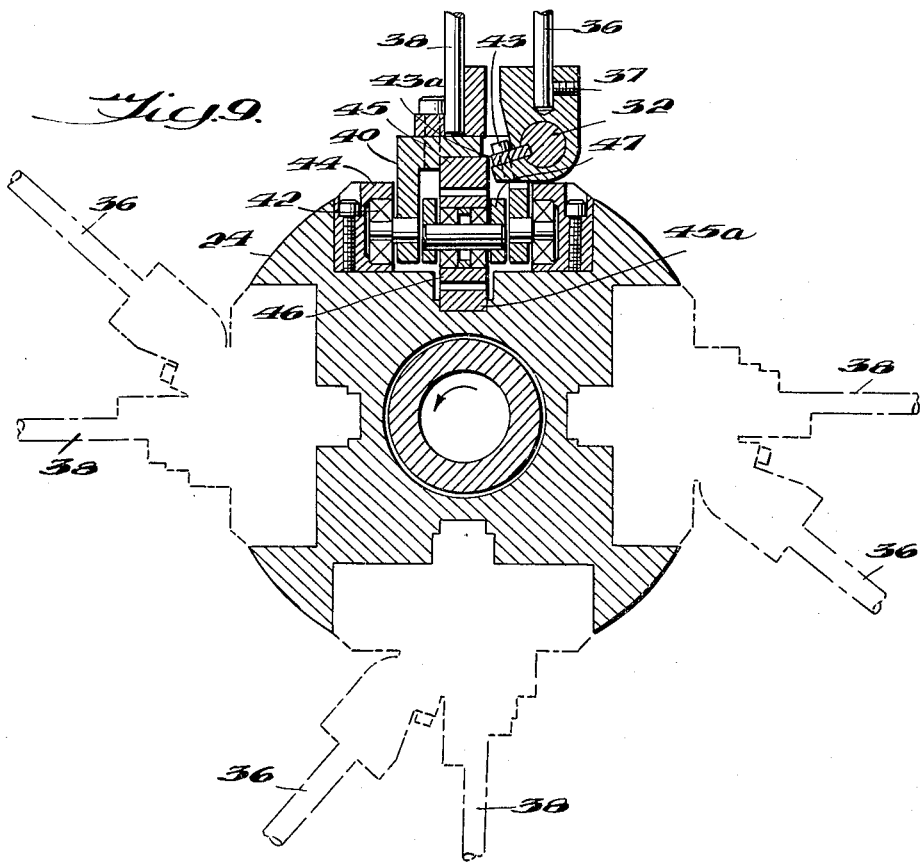

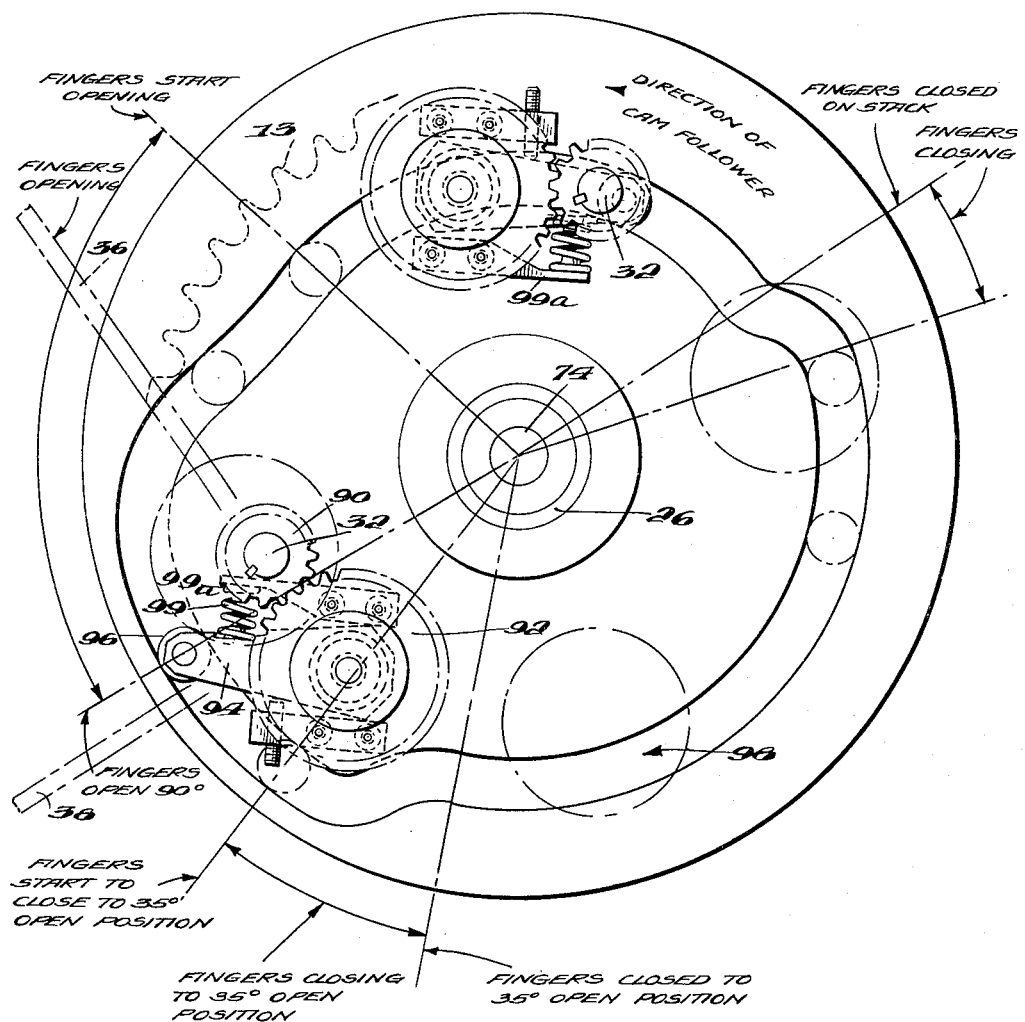

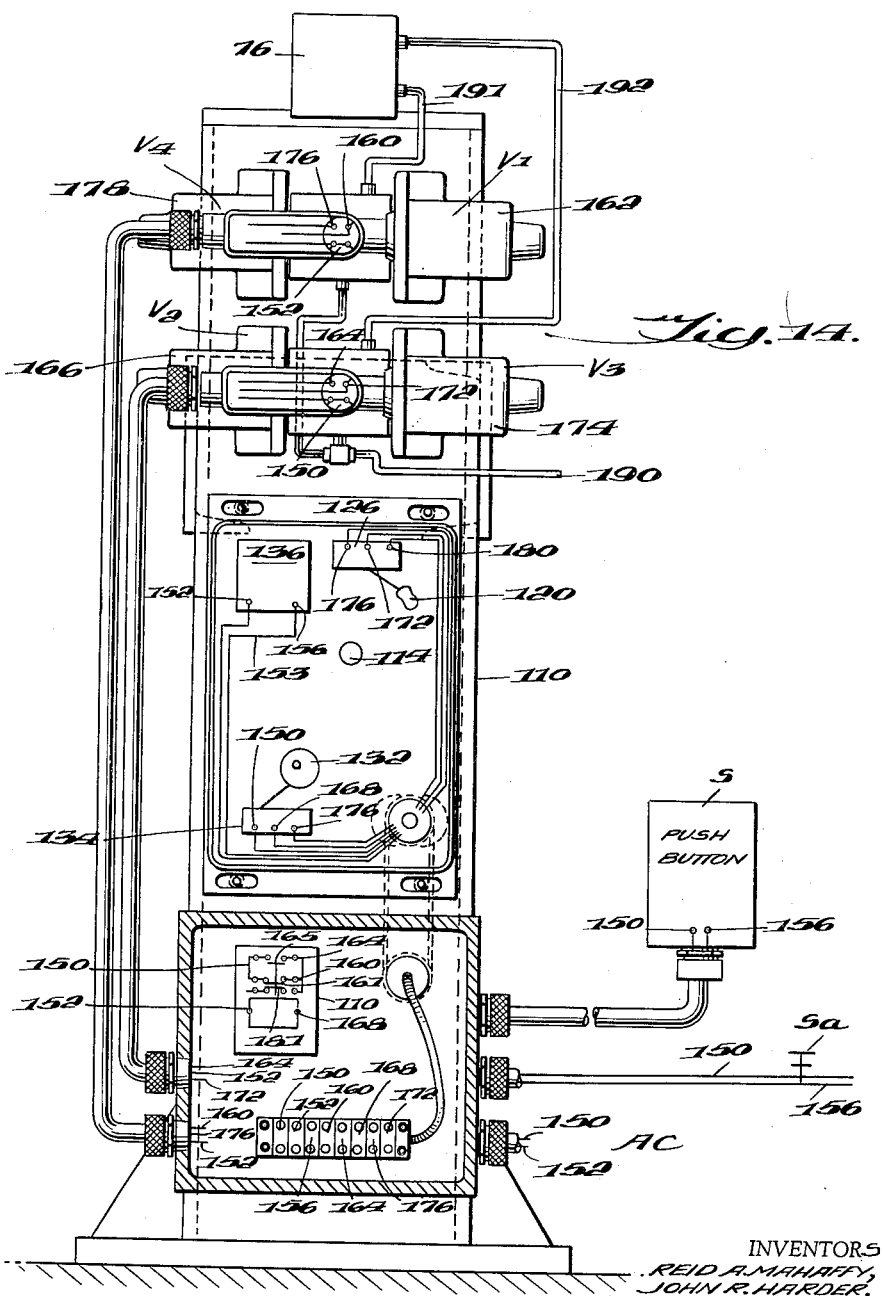

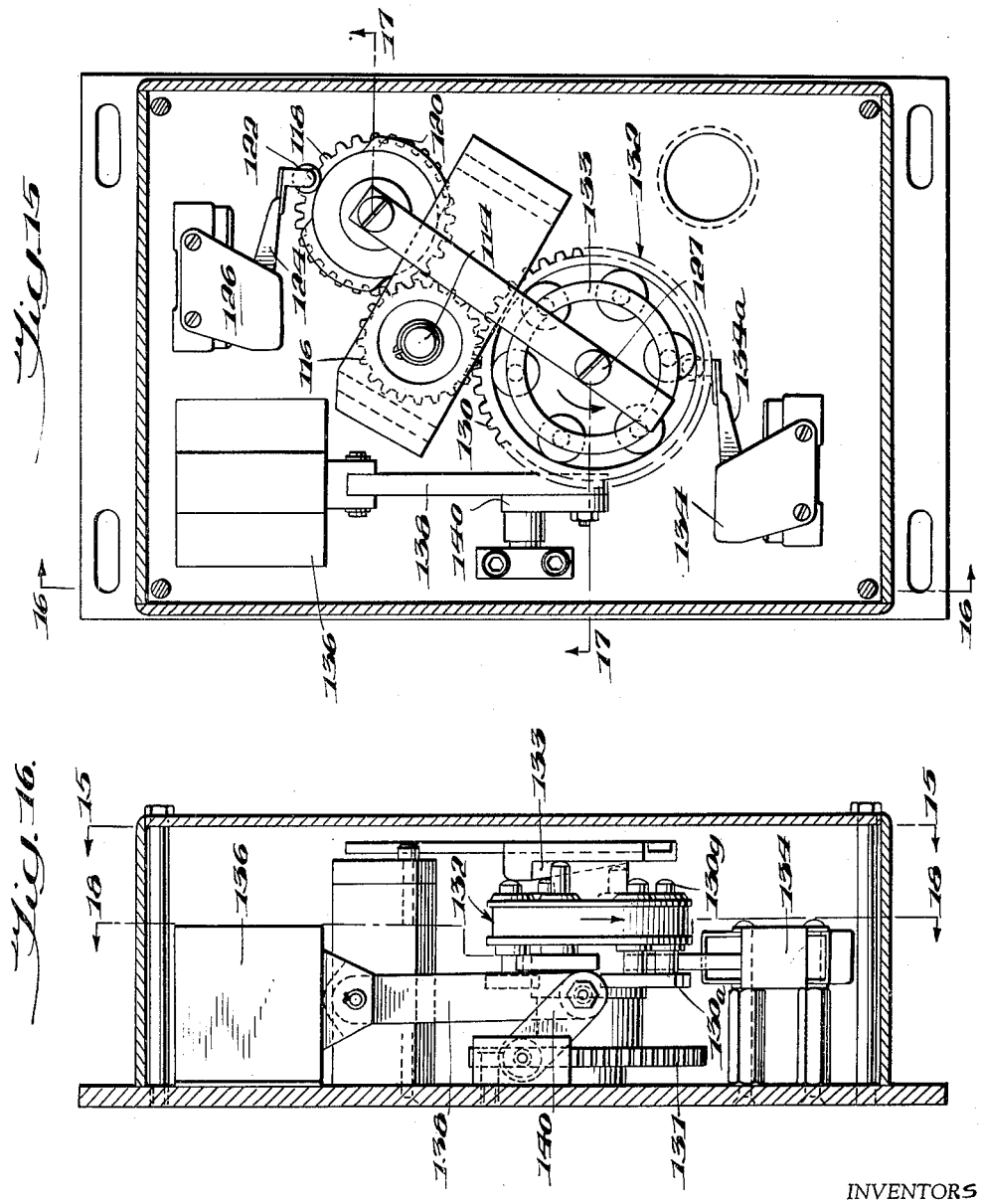

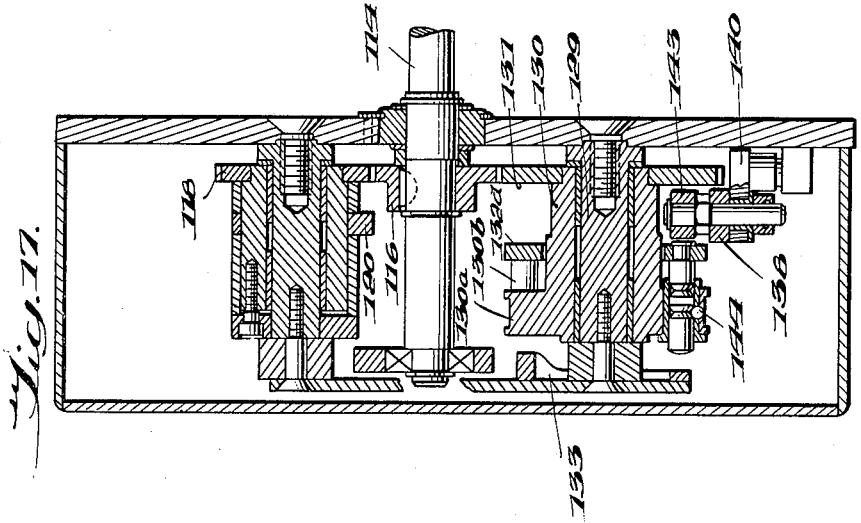
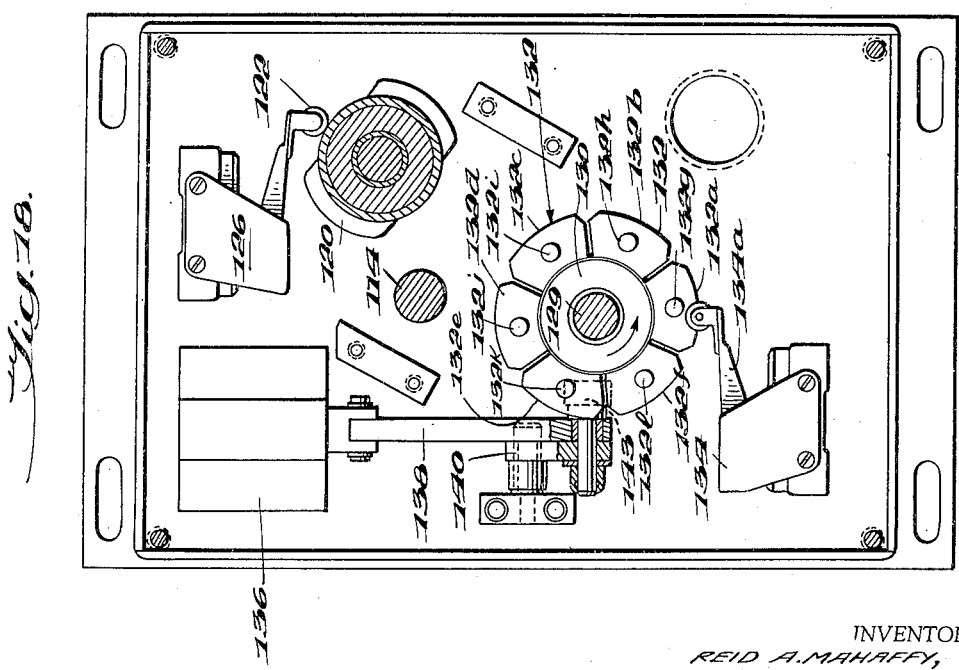

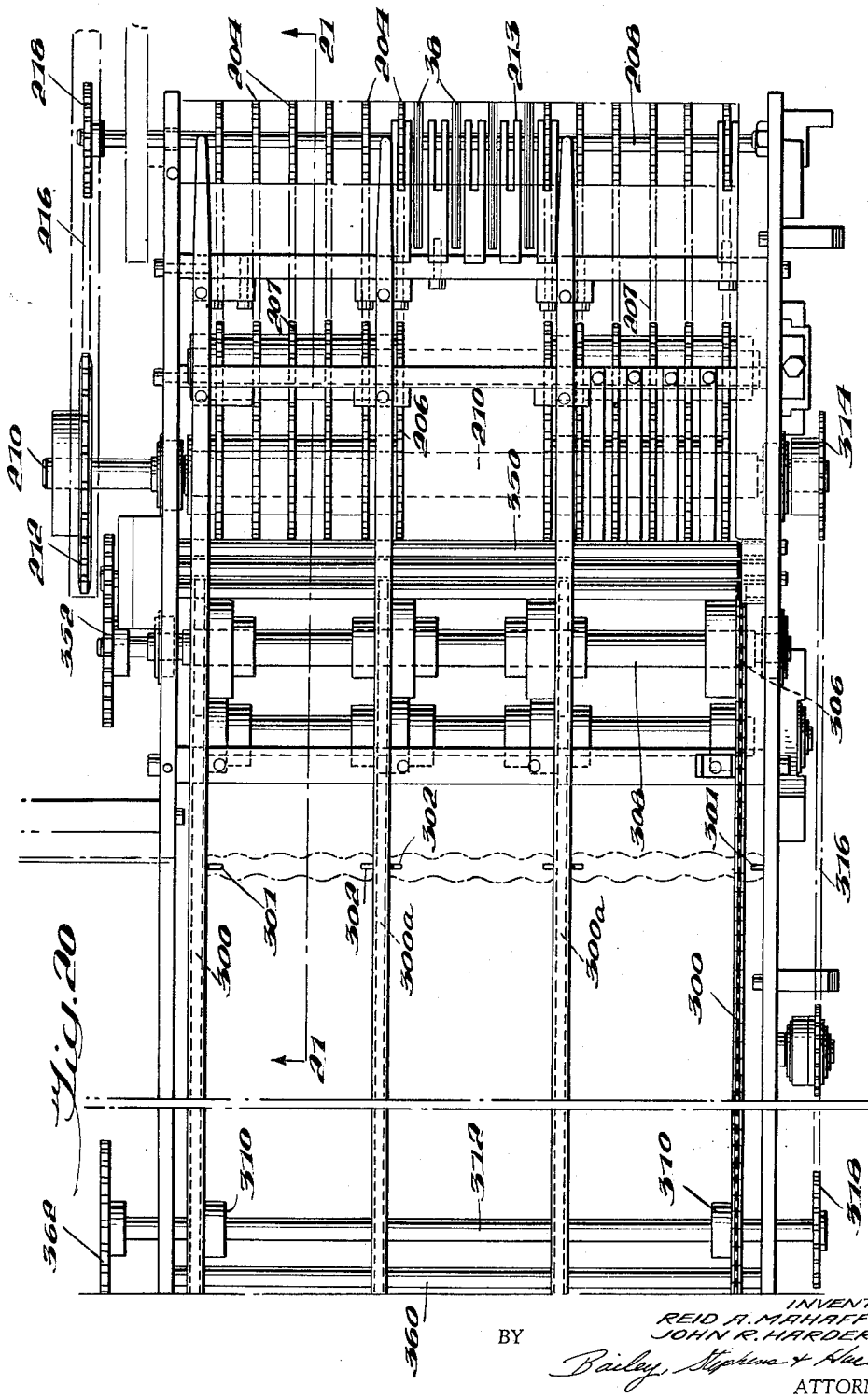

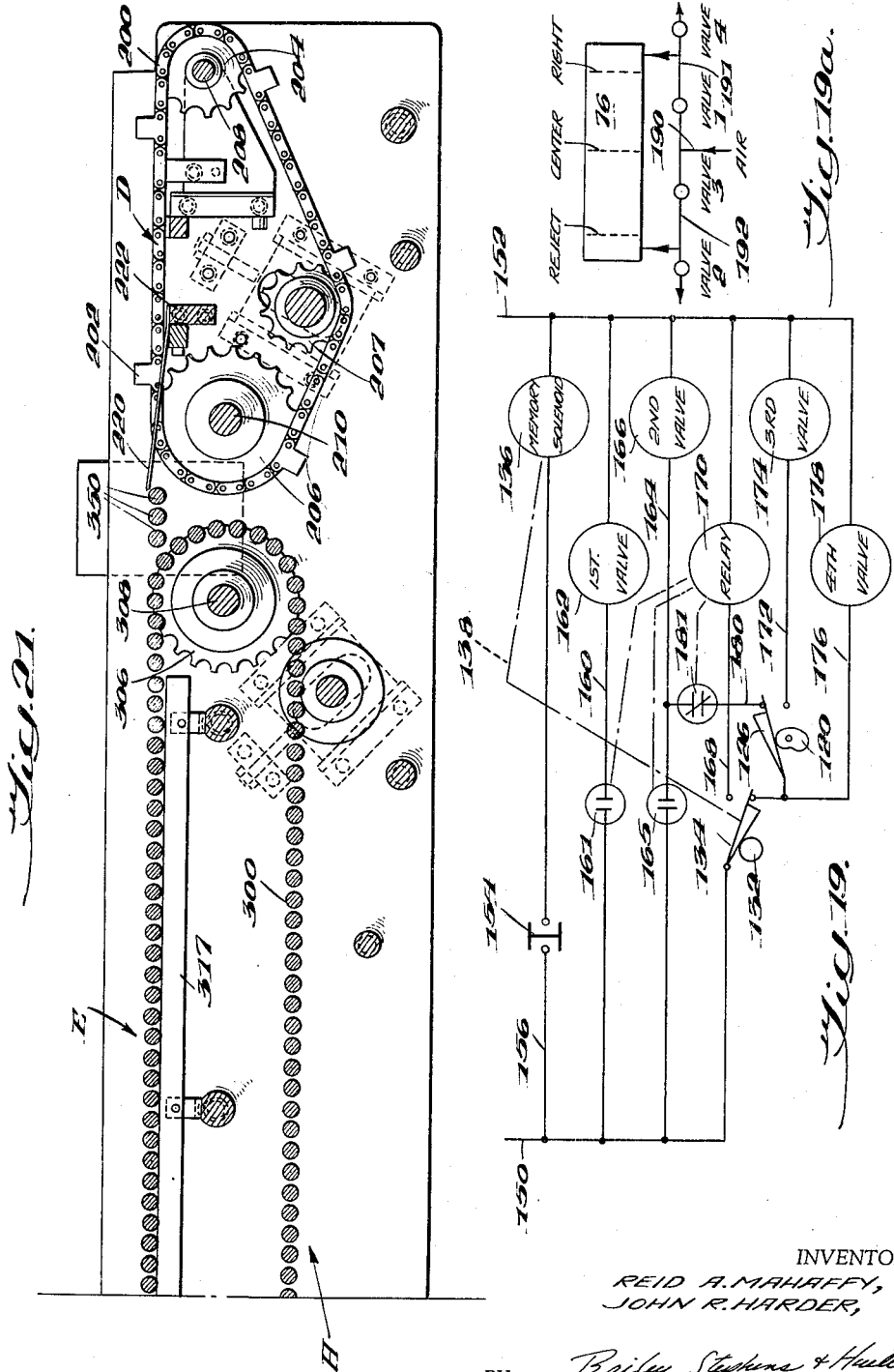

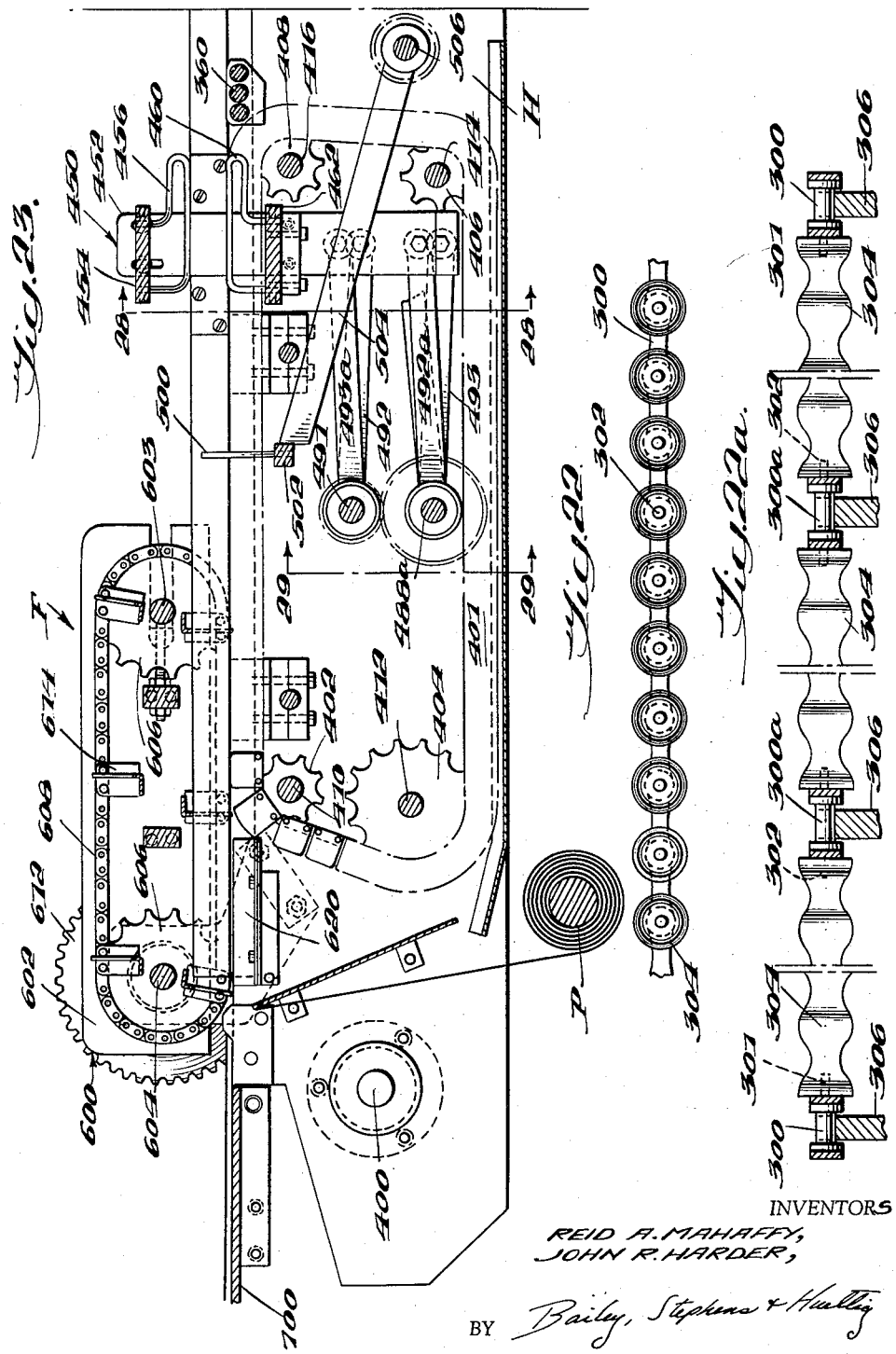

INVENTORS
REID A. MAHAFFY,
JOHN R. HARDER,
BY Bailey, Stephens & Huettig
ATTORNEYS

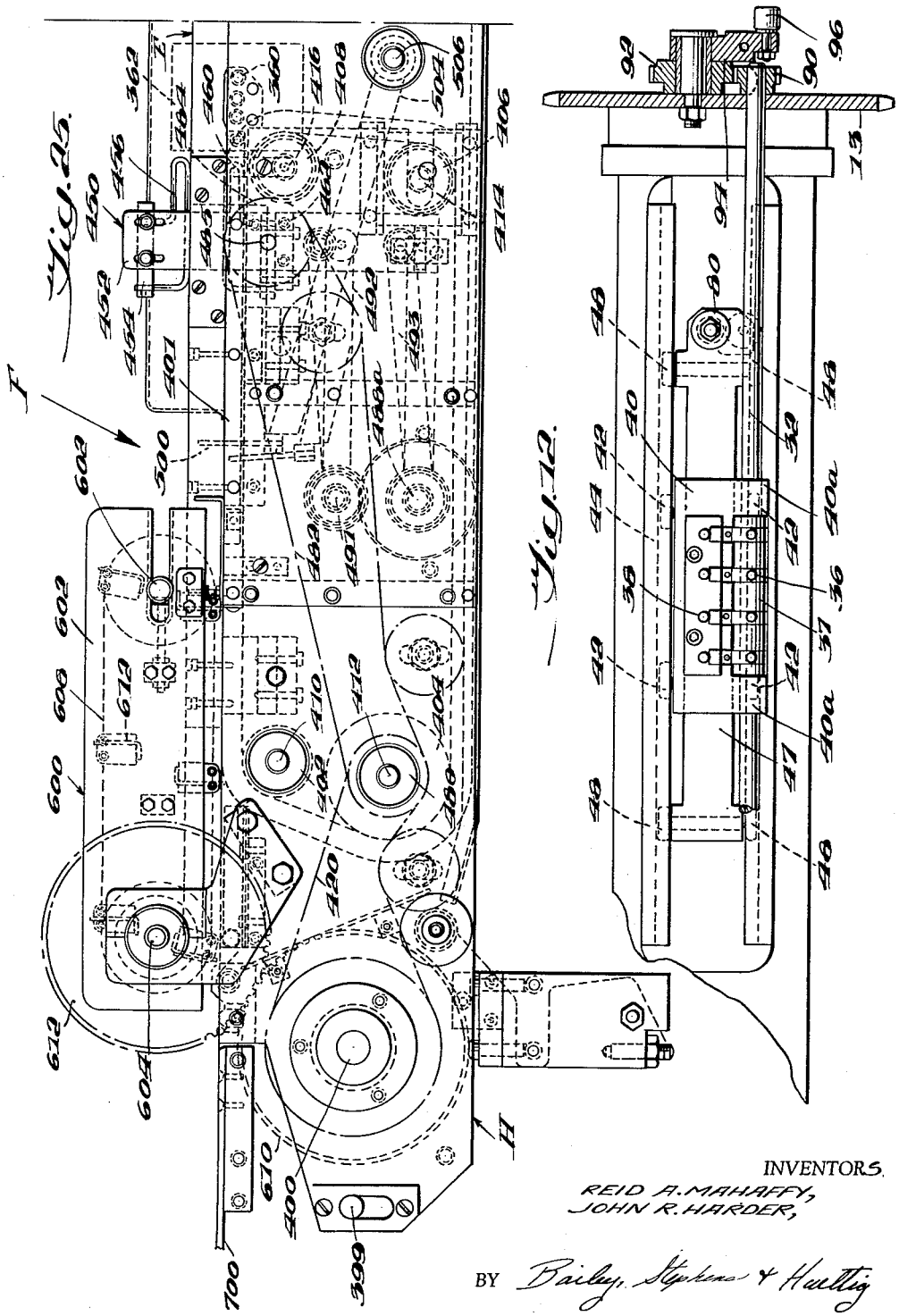

Nov. 21, 1961 R. A. MAHAFFY ET AL 3,009,299
AUTOMATIC SWITCHING AND STORAGE CONVEYOR
Filed Sept. 2, 1958 19 Sheets-Sheet 18
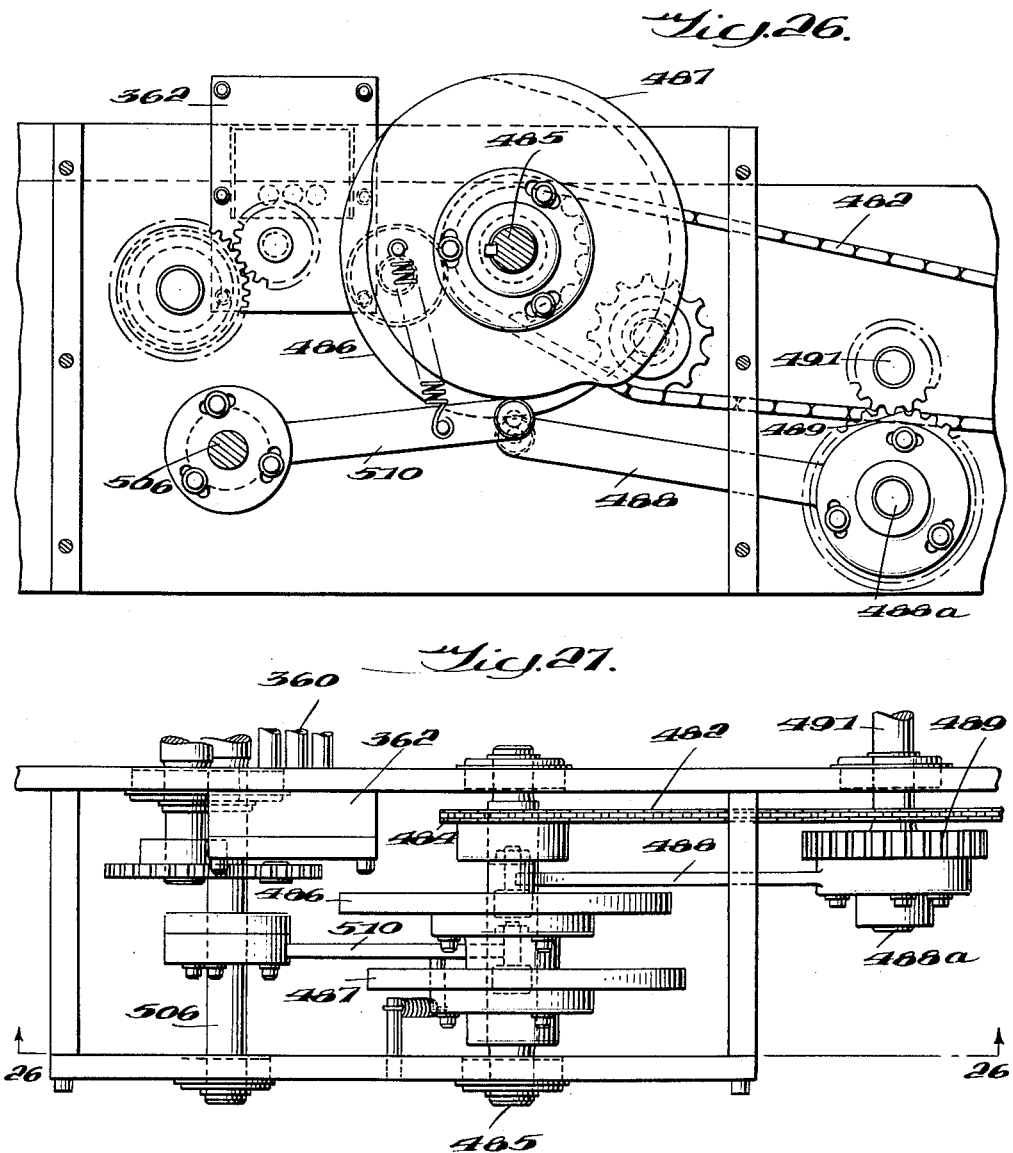
INVENTORS
REID A. MAHAFFY,
JOHN R. HARDER,
BY *Bailey, Stephens & Huettig*
ATTORNEYS

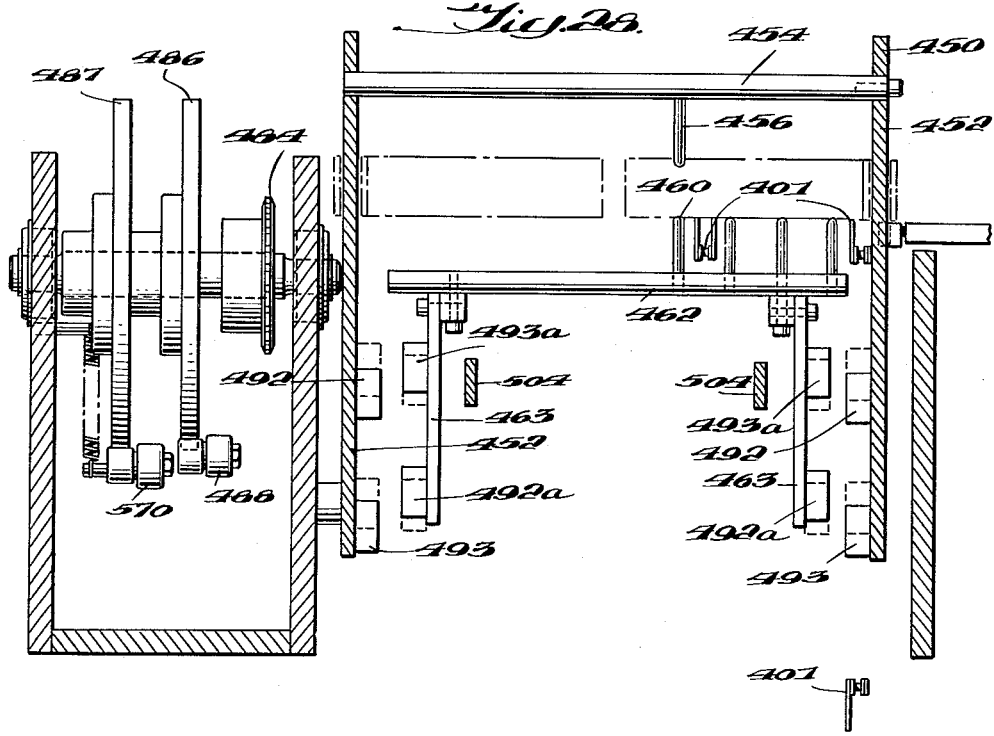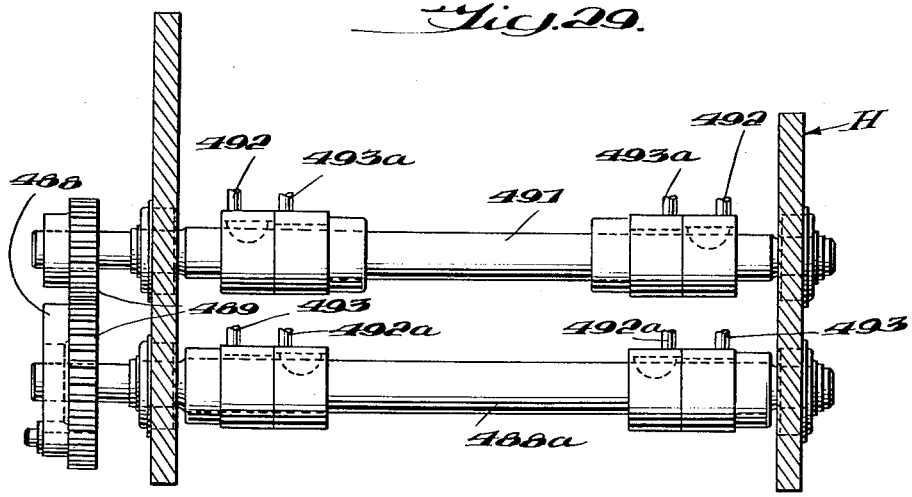

United States Patent Office

3,009,299
Patented Nov. 21, 1961

3,009,299
AUTOMATIC SWITCHING AND STORAGE
CONVEYOR
Reid Alexander Mahaffy, Montclair, and John Richard Harder, Cedar Grove, N.J., assignors to Albert F. Goetze, Incorporated, Baltimore, Md., a corporation of Maryland
Filed Sept. 2, 1958, Ser. No. 758,186
7 Claims. (Cl. 53—54)

This invention relates to an automatic switching and storage conveyor. In particular, the invention is directed to the transfer of slices of food from a food slicing and weighing machine to a packaging machine.

In the processing of sliced foods, such as luncheon meats, a loaf of meat is rapidly sliced, the slices collected into stacks and weighed, and placed on a conveyor for transfer to a packaging apparatus. For purposes of describing this invention, a food slicing machine is of the type shown in the copending application of Good, Serial No. 497,554, filed March 29, 1955, for "Food Slice Grouping Machine" (now U.S. Patent No. 2,989,104) or in the patent to Allbright No. 2,812,792. A packaging apparatus of the type used as an example in this case is a packaging machine as made and sold by the Standard Packing Corporation of New York, New York, and known under the trademark "Vacpack (6–12)." The stacks or bundles of food slices coming from the platform of the automatic weighing scale must be sorted to eliminate stacks which are over and under a standard weight, and the stacks of correct weight delivered in an even flow to the packaging machine in proper register with the stack receiving cavities in the machine.

In the handling of cans and bottles, apparatuses are known for continuously handling such rigid and slidable articles from a supply source to automatic filling and packaging machines. However, the handling of uniform pieces, stacks or bundles of sticky, plastic, and/or structurally weak materials, including the switching and storage thereof, such as pieces of luncheon meat, has heretofore been done manually.

An object of this invention is to produce a transfer device for taking articles such as stacks of food slices or like materials from a single flow path and placing them in two or more paths according to a predetermined plan. Another object is to produce a storage device for retaining such materials in two or more parallel paths, to which paths the materials may be delivered intermittently at a certain rate and hold the material in the paths for moving them continuously forward at a uniform lesser rate which is preferably equal to the average rate at which the items are received by the transfer and storage device. Still another object is to produce a transfer device which will deliver the structurally weak materials from the paths without undue damage and without disarrangement of the slices in a bundle or stack. A further object of the invention is to deliver the stacks of slices in timed sequence and in proper registry with the packaging cavities in a packaging apparatus.

In general, these objects are accomplished by a switching device which grasps each stack as it is discharged from a conveyor coming from the weighing scales. This switching device is controlled by signals received from the weighing scale so that if any particular stack is over or underweight it is moved by the switching device and placed on a reject conveyor path. Stacks which are of acceptable weight are switched to two or more paths in alternate sequence, with this sequence being interrupted by the occurrence of an off-weight stack which is switched to the reject path.

The paths following the switching device are each composed of a series of endless conveyors. From the switching device, the individual groups are first received upon an endless chain belt transfer conveyor which assures positive removal of each group and then passes it onto a storage conveyor. This storage conveyor is also an endless belt having a surface formed of freely independently turnable rollers. Each stack therefore is moved forwardly on the roller conveyor, but when a bundle contacts a preceding bundle and is stopped, the roller conveyor continues to move with the stack being stationary while riding on the turntable individual rollers upon which the stack rests. This thus constitutes a storage conveyor on which the structurally weak materials are either moved or held stationary without damage to the stacks. Following, the stacks in the "material accepted" paths pass through a stack stopping and separating means or escapement means, and then between the reaches of an upper and lower conveyor, wherein the stacks are pushed into proper position for being received in register by the packaging apparatus.

The means by which the objects of the invention are obtained are disclosed more fully with reference to the accompanying drawings, in which:

FIGURE 1 is a perspective view of the automatic switching and storage conveyor;

FIGURES 2, 3 and 4, respectively, are perspective views of the inlet switching end of the conveyor showing the driving mechanism therefor;

FIGURE 5 is a perspective view of the outlet delivery end of the conveyor;

FIGURE 6 is a plan view of the switching end of the conveyor with the switching device drum removed;

FIGURE 7 is a side elevational view of FIGURE 6 with the shaft for the switching device drum shown;

FIGURE 8 is a longitudinal cross-sectional view through the switching device;

FIGURE 9 is a cross-sectional view on the line 9—9 of FIGURE 8;

FIGURE 10 is a cross-sectional view on the line 10—10 of FIGURE 8;

FIGURE 11 is a cross-sectional view on the line 11—11 of FIGURE 8;

FIGURE 12 is a detail plan view of the switching carriage shown in FIGURE 8;

FIGURE 13 is a perspective view of the barrel cam for the switching device;

FIGURE 14 is a front view of the switching device actuating and timing and memory unit;

FIGURE 15 is a cross-sectional view of the timing and memory unit on the line 15—15 of FIGURE 16;

FIGURE 16 is a cross-sectional view along the line 16—16 of FIGURE 15;

FIGURE 17 is a partial cross-sectional view generally on the line 17—17 of FIGURE 15;

FIGURE 18 is a cross-sectional view on the line 18—18 of FIGURE 16;

FIGURE 19 is a schematic wiring diagram of the control circuit for the switching device;

FIGURE 19a is a schematic diagram of the air flow to the piston in the switching device;

FIGURE 20 is a plan view of the driving gear for the first chain and storage conveyors of the transfer device;

FIGURE 21 is a cross-sectional view on the line 21—21 of FIGURE 20 with the conveyor chains added;

FIGURE 22 is an enlarged detailed view of a portion of the roller storage conveyor;

FIGURE 22a is a transverse view of FIGURE 22;

FIGURE 23 is a longitudinal cross-sectional view through the escapement and the delivery conveyor;

FIGURE 25 is a side elevational view of FIGURE 24;

FIGURE 26 is a side elevational view of a cam detail in FIGURE 24 on the line 26—26 of FIGURE 27;

FIGURE 27 is a plan view of FIGURE 26;

FIGURE 28 is a cross-sectional view generally along the line 28—28 of FIGURE 23; and FIGURE 29 is a cross-sectional view on the line 29—29 of FIGURE 23.

Figure 24:
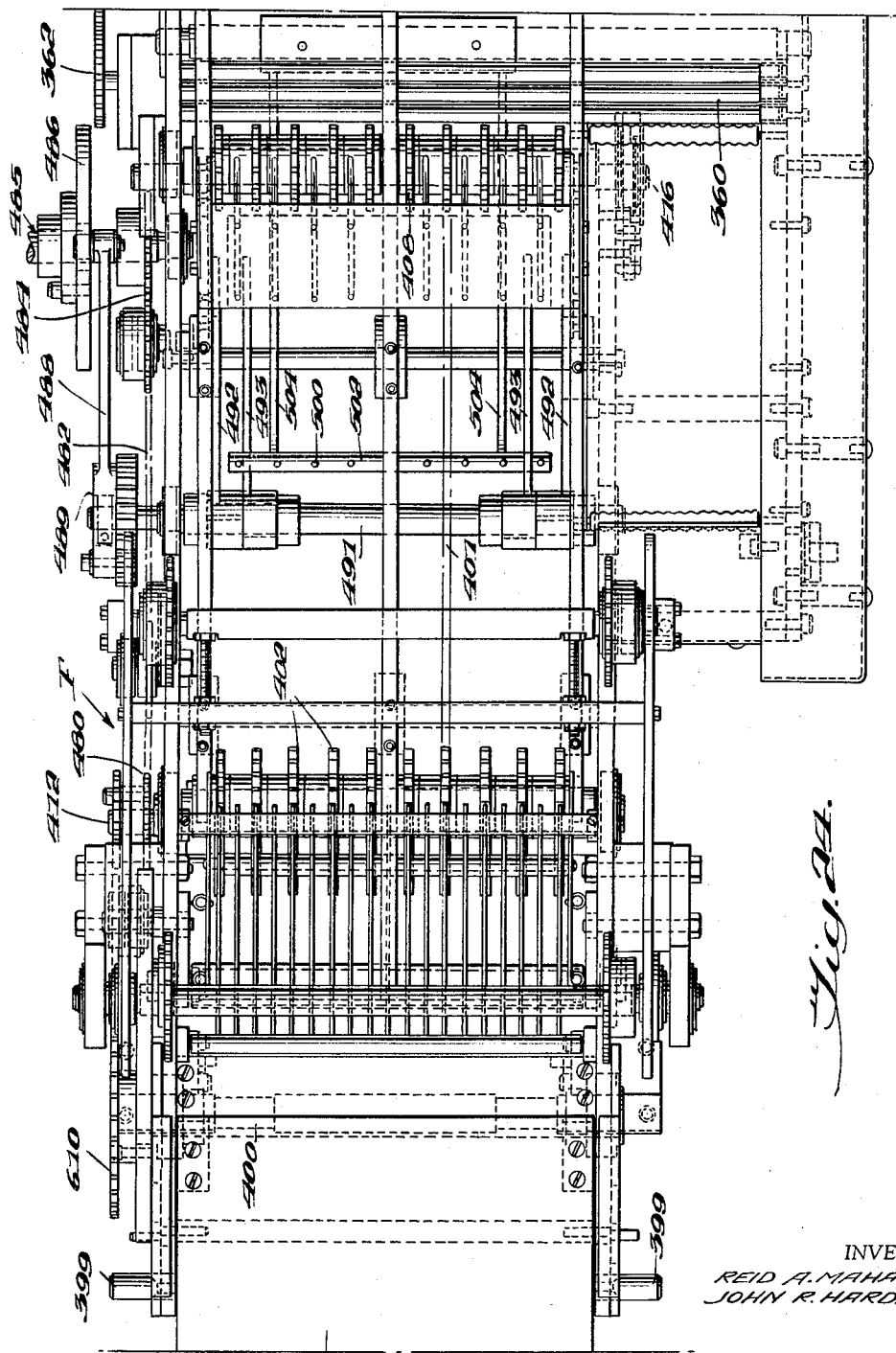
FIGURE 24 is a plan view of the escapement and the delivery conveyor.

As shown in FIGURE 1, the food slicing, stacking and weighing machine A, as, for example, a machine shown in Good application Serial No. 497,554, intermittently produces bundles or stacks of slices faster than they can be received and packaged in order by the packaging machine B, which may be the "Vacpack" machine referred to heretofore. The latter machine, note FIGURE 5, in essence consists of a cylinder having two rows of cavities in the periphery thereof for receiving the stacks to be packaged. The stacks coming from the slicing machine must therefore be ordered into two rows corresponding to the cavities in the packaging cylinder and must be fed to the packaging cylinder in registry with the position of the cavities. In addition, due to the lack of uniformity in the shape and density of the loaves of food being sliced, there is the likelihood of certain stacks being either over or under the allowable tolerances from a given weight, and such stacks must be rejected so that their weight can be corrected before they are packaged.

The automatic switching and conveying apparatus for accomplishing the proper transfer of the stacks of food from the slicing machine to the packaging machine is composed in general of an automatic switching device C which receives the stacks of food from the slicing machine and places them on a chain conveyor D which is separated into three rows, two of the rows being for stacks of satisfactory weight, and the third row being the rejection row. This chain conveyor moves the stacks of food in the rows onto a roller storage conveyor E which urges the stacks onward toward the packaging machine. Following the storage conveyor E is an escapement and delivery conveyor F which arranges the individual stacks into properly spaced positions so that they are delivered to the packaging machine in proper register with the cavities on the packaging cylinder by being pushed onto an advancing web of packaging material in machine B.

As shown in FIGURES 6 to 12, the switching device C comprises a rotating drum 10 journaled on a pair of posts 12 supporting the conveyor frame H. This drum is rotated by means of a sprocket 13 connected by sprocket chain 14 to a sprocket 16 which in turn is driven by a sprocket chain 18 attached to a sprocket 20 driven by the slicing machine A.

In detail, the switching device of drum 10 is composed of a cylinder 24 rotatably mounted on a stationary tubular shaft 26 fastened in posts 12, with bearings 28 between the cylinder 24 and shaft 26. One end of the cylinder 24 is joined to sprocket 13, while the other end is secured to end plate 30. Also extending between sprocket 13 and end plate 30 are a plurality of rods 32, four in number as shown. Slidably mounted on each rod is a clamping device composed of two pairs of four fingers each, one of the pair 36 being secured to block 37 both slidable on and turnable with rod 32, while the other of the pair of fingers 38 is fixed to an inverted channel shaped member 40 having pairs of wheels 42 which travel in tracks 44 mounted in a groove in cylinder 24. One side of member 40 is cut away to form a space in which block 37 is fitted, and leaving end portions 40a, FIGURE 12, having bores through which rod 32 passes. Rod 32 has a longitudinal keyway groove in which slides key 43 fastened to block 37. The cut-away portion of block 37 also contains slots 43a which provided clearance for the keys 43 as they are rotated by rod 32. Rack 45 is secured to the underside of member 40. A second rack 45a is secured to the bottom of the cylinder groove. Between these two racks is a spur gear 46 journalled to a carriage 47 which is also movable in tracks 44 on pairs or rollers 48. Carriage 47 is moved longitudinally of cylinder 24 by a cam follower 80, hereinafter described, and in so moving translates rack 45 and fingers 36 and 38 substantially over the entire longitudinal length of the cylinder.

Fixed to shaft 26 is a barrel stationary cam 60 which has a central cam track 62 and two cam tracks 64 and 66, respectively, extending toward the end of the barrel cam. Mounted in a slot 68 extending almost the entire length of barrel cam 60 is a switch 70 of less length than the slot 68 and having a switch track 72, which by the sliding of switch 70 can be brought into alignment with either of the tracks 62, 64 or 66. Switch 70 in turn is connected to an axially extending rod 74 which is coaxial with shaft 26 and extending through piston cylinder unit 76 having a double acting piston therein, with the free end of rod 74 being urged to the central position shown by means of spring 78 working against washers 79 each of which is movable toward the other. A roller cam follower 80 secured to member 47 is slidable in each of the cam tracks in cam barrel 60 to which the cam follower is moved by switch 70.

Each of the rods 32 carries a set of the grabber fingers 36. The end of the rod 32 journalled in sprocket 13 extends through the sprocket and is connected to a cam follower so that rod 32 can be rotated to open and close fingers 36 relative to fixed fingers 38. As shown in FIGURES 8, 11 and 12, a gear 90 secured to rod 32 meshes with gear 92 rotatably mounted on sprocket 13 and to which is rotatably mounted an arm 94 which carries a roller cam follower 96. This cam follower runs in a cam track 98 formed in stationary cam plate 100 which is fastened to shaft 26. Spring 99 fastened between lever 94 and a stop 99a secured to gear 92 provides the clamping force between fingers 36 and 38 through gear 90 and also allows for variations in thickness of the stacks clamped therebetween. Each rod 32 is fitted with one of these geared and spring-biased follower units which all follow the single track 98.

In operation, switching device 10 revolves counterclockwise as seen in FIGURES 9 and 11. As the fingers rise to horizontal position facing machine A, the fixed leading fingers 38 clear the path of the reciprocating conveyor in machine A, and fingers 36 are opened downwardly. Then the reciprocating conveyor thrusts a stack between fingers 36 and 38, whereupon rising fingers 36 reach horizontal, pick up the stack, and begin to close rapidly just above horizontal. In upper vertical position, the fingers are closed, with the stack grasped tightly therebetween. In the beginning of downward descent, the weight of the stack becomes carried by fixed fingers 38, and fingers 36 start opening. As fingers 38 pass through conveyor D, the stack is deposited on the conveyor chains, which move the stack away before the now fully opened fingers 36 can reach and come into contact with the deposited stack.

The timing operation of the switching device begins with a description of the signal pulses received from the weighing scale. In the Good slicing machine, as disclosed in Serial No. 497,554, the stacks of slices are conveyed to and from the scale platform by means of a reciprocating conveyor G, note FIGURES 1, 2 and 3. This conveyor has longitudinally extending arms which rise to lift a stack of slices from the scale platform, move the stack forwardly, and then lower to set the stack down on a rack and then return to the platform for picking up another stack of slices. The next movement picks up the stack and thrusts it forwardly into the path of the movable fingers 36. Consequently, a stack which is weighed at zero position on the weighing platform, where a signal may be generated, moves to a first position on the rack, and then to a second position when advanced to fingers 36 and 38, and these two positions correspond to two impulses. Fingers 36 pick up the stack of slices from reciprocating conveyor G at the second impulse time, and fingers 36 close to grasp the stack. Just before fingers 36 and 38 reach a vertical position, a stored reject signal, if any, will be delivered to the piston which directs switch 72 to the reject position where it remains during the time the cam follower 80 controlling the longitudinal motion of the fingers is passing through switch 72 delivering follower 80 to reject track 64. Therefore, after vertical position is passed, the carriage 47 starts on the predetermined path with the movement completed just before the fixed fingers 38 reach horizontal position. If the weight of a stack is within the allowable tolerance, no reject signal is transmitted to the switching device, and in particular to switch 72. Therefore, no impulse is created and stored in a memory device, and then the switching device is activated to move the fingers so as to deposit successive stacks alternately in the center and right side alternate paths. A reject signal interrupts this alternate sequence.

The timing memory device is illustrated in detail in FIGURES 14 to 19a, inclusive. The memory unit contained in housing 110 is located beneath piston cylinder unit 76. As seen in FIGURES 6 and 7, shaft 15, which is driven by the slicing machine A, is connected by sprocket chain 112 to shaft 114 which extends into the memory device 110. Fastened on this shaft is a gear 116 which meshes with a gear 118 carrying a cam track 120 by means of which cam follower 122 connected to arm 124 actuates alternating switch 126. Beneath shaft 114 is a stub shaft 129 fixed to the housing, and having rotatable thereon a sleeve 130 carrying a flange 130a on one end thereof, and having fixed to its opposite end a gear 131 which is meshed with gear 116. Slidable on sleeve 130 is a cam 132 composed of a plurality of separated individual cam segments 132a to f, the outer peripheral edge of each constituting a cam track. Each segment is fixed to a pin 132g to l, respectively, which is slidably fitted in a bore extending through flange 130a in an axial direction. A member carrying cam 133 is secured to stub shaft 129 so that this cam can be reached by the pins. Segments 132a–f are adapted to be moved individually to a position where they will strike the operating arm 134a of switch 134. A solenoid 136 when energized lifts arm 138 which in turn lifts lever 140 carrying roller 143 causing the roller to strike the particular segment 132a–f which happens to be in position and moving the segment to where it will strike switch arm 134a, and its pin to where it will contact cam 133. Each pin 132g–l is retained in either of its positions by ball detent 144.

The electrical wiring for memory device 110 is shown in FIGURE 14 and in the circuit diagram of FIGURE 19. Lines 150 and 152 are connected to a current source, as to a 115 v. A.C. source. Switch 154 is connected to the weighing platform for the scale of slicing machine A so that this switch closes whenever the stack of slices is either over or under the allowable weight, and the switch is joined in line 156 having solenoid 136 and extending between lines 150 and 152. Successively joined across lines 150 and 152 are line 160 containing a solenoid 162 for operating a first air valve; line 164 for operating a second air valve 166; line 168 containing switch 134 and relay 170; line 172 with switch 126 and solenoid 174 for operating a third air valve; and line 176 having solenoid 178 for actuating a fourth air valve. Line 180 joins switch 126 to line 164. The valves operated by solenoids 162, 166, 174 and 178 are in compressed air lines leading to cylinder unit 76 to operate the piston therein.

When switch 154 is closed by an off-weight stack, the signal must be retained in the memory device until that off-weight stack has been seized by the fingers of the switching device, and then the signal applied to the air valves so that the switching device will deposit the stack on the reject path of the conveyor. Also stacks of acceptable weight must be placed alternately on the two accepted conveyor paths for transfer to the wrapping machine B. To accomplish these functions, shaft 114 rotates cam 120 one revolution for each four stacks weighed so that switch 126 alternately connects line 176 to lines 164 and 172. If no reject signal has been received by the closing of switch 154 to change switch 134 from the position shown, line 150 remains connected to line 152 through line 176 and the fourth valve operated by solenoid 178 is held open. When cam 120 holds switch 126 in the shown position, a circuit exists through lines 180 and 164 to solenoid 166 to hold the second valve open, and the first and third valves remain closed. The spring 78 now holds the piston in center position and the switching device will deposit the corresponding stack in the middle conveyor path. Then a half revolution of cam 120 connects switch 126 to line 172, and thus closes the second air valve and opens the third air valve, thus forcing the piston to the right end side of FIGURE 8 and placing the stack on the righthand side path of the conveyor.

When the weighing platform closes switch 154, solenoid 136 is energized, thus lifting arm 138, and translates one of the segments 132a–f of cam 132 to connect switch 134 to line 168. Line 150 therefor is closed with and energizes relay 170 which opens relay contacts 181 and closes relay contacts 161 and 165. Thus the first and second air valves are opened, and the third and fourth valves are closed. The piston is then driven to the left so that the stack is deposited upon the reject path. Switch 134 is returned to contact with line 176 by leaving cam 132. Cam 133 returns any cam segment 132a–f to starting position. The relative positions of the valves with respect to the piston are diagrammatically illustrated in FIGURE 19a.

Cam 132, FIGURES 15 to 18, mounting the six cam segments 132a–f, inclusive, is geared so it is driven by shaft 114 to rotate once while six stacks are successively weighed on the weighing platform. When arm 138 is lifted, it remains in this position to actuate switch 134 two positions after the stack has been weighed and when the stack has been grabbed by the fingers on the switching device. When an extended element 132a–f rotates pass switch 134, the piston is caused to return to center position, and cam 133 returns the pin to the starting point.

As seen in FIGURE 14, the electric lines controlling solenoid 136 can be branched to one or more push buttons S or Sa mounted about the apparatus such as on a post T, FIGURES 1 to 4, for emergency operation of the reject function whenever it is apparent that unacceptable stacks, even if of proper weight, are coming from machine A.

Compressed air comes from a source through line 190, goes to the first and third valves V1 and V3, and then through pipes 191 and 192 to piston cylinder 76 as directed by the respectively energized solenoids.

A frame H composed of two parallel beams is supported at one end by uprights 12 and the other end by wrapping machine B, and carries the conveyors D, E and F.

Chain conveyor D, FIGURE 21, is composed of a plurality of endless sprocket chains 200, the links of which include spaced lug links 202. Each chain extends around a pair of sprocket wheels 204 and 206 mounted on shafts 208 and 210, respectively, journalled in frame H, and also around an adjustable idler sprocket 207. Shaft 210 extends through frame H and has a drive sprocket 212 mounted on its outer end. Partially enclosing each sprocket 204 is a stripper blade 213.

The drive for conveyor D, note FIGURES 3, 6, 7 and 20, comes from shaft 15 carrying sprocket 214. Chain 216 runs over sprockets 212 and 214 and beneath adjustable idler sprocket 218.

Each chain 200 is spaced from its adjacent chain so that the grabber fingers 36 and 38 can pass through the spaces and deposit a stack on the conveyor D, the fingers passing between sprockets 204 and thus clearing shaft 208. When soft materials such as stacks of sliced luncheon meat are being conveyed, the lugs on links 202 constitute a protective measure in that, should the stacks jam together or for some reason fail to move forward to clear the path for the passage of fingers 36 and 38, the stacks will be cut and shredded by the lugs with the pieces falling through the spaces between chains 200. At the delivery end of conveyor D, fingers 220, FIGURE 21, have one end attached to transverse beam 222 of frame H, and their free ends serving to bridge the space between conveyors D and E so that the stacks can be transferred onto the latter.

Storage conveyor E, FIGURES 20, 21, 22 and 22a, is composed of a plurality of endless sprocket chains 300 and 300a. The outermost chains 300 have their link pins 301 extended inwardly, while the intermediate chains 300a have their link pins 302 extended on both sides. Journalled on the pins between adjacent chains are a plurality of individually freely rotatable corrugated nylon rollers 304. At one end, the chains 300 and 300a are carried on sprockets 306 mounted on a shaft 308 and journalled in frame H. At the other end, adjacent packaging machine B, chains 300 and 300a are carried by sprockets 310 mounted on shaft 312, FIGURE 20. The drive for chains 300 and 300a comes from a sprocket 314 mounted on shaft 210 and a sprocket chain 316 running to sprocket 318 on shaft 312. Thus shaft 312 is the drive shaft and shaft 308 the driven shaft. Chains 300 and 300a are supported in tracks 317, FIGURE 21.

As chains 300 and 300a move, the food stacks are carried on the nylon rollers 304. These rollers form the reject path, the center path, and the right side or alternate path, respectively. The number of stacks on the center and alternate paths waiting for further passage to packaging machine B, depends both upon the rate stacks are received from slicing machine A by switching device C, and the number of stacks which are eliminated by being placed on the reject path. As chains 300 and 300a urge the stacks along the paths, and as the movement of each stack is stopped temporarily by escapement register conveyor F, the stacks in each path will jam against each other. Damage to each stack is prevented because each roller 304 will revolve as a stack is stopped and thus the rollers pass under the stopped stacks with only a very slight frictional contact. Thus the stacks are only gently pushed together without damage.

To assist in the movement of the food stacks onto and off from storage conveyor E, a series of revolving transfer rollers is mounted at each end of conveyor E. As shown in FIGURES 2, 3, 4, 20 and 21, three cylindrical rollers 350 are journalled in frame H with their top edges lying substantially in the plane of the upper surfaces of conveyors D and F. These rollers are connected by a gear train 352 to shaft 308, the gearing being such that the peripheral speed of the rods approximates the linear speed of the adjacent conveyors. At the opposite end of conveyor E, FIGURES 1, 5, 20, 23, 24 and 25, are similar transfer rollers 360 which are driven from shaft 312 through a gear train 362.

The delivery end of frame H, for convenience, rests upon the frame of wrapping machine B, and is secured thereto by any suitable means, FIGURES 1, 5, 24 and 25, as by mounting lugs 399. Shaft 400 has a sprocket 401 which is rotated by the driving mechanism for machine B by a chain not shown. Consequently, shaft 400 is powered to drive register conveyor F in exact timing with machine B.

The lower portion of conveyor F, FIGURE 25, is composed of a plurality of parallel sprocket chains 401 running around sprockets 402, 404, 406 and 408 mounted on shafts 410, 412, 414 and 416, respectively, which in turn are journalled in frame H. These chains 401 are essentially similar to the chains forming conveyor D, but without the lug links and except that the chains forming the reject path are provided with nylon rollers as in storage conveyor E in order to make additional storage space for rejected stacks. A sprocket chain 420 extending between sprockets on shafts 400 and 412 outwardly of frame H serves as the drive for chains 401.

When the food stacks are received upon conveyor F from conveyor E, it is desired to halt their movement momentarily to allow one stack in each of the two acceptable paths to proceed alone on conveyor F. This is done by an escapement clamping device 450, FIGURES 23 and 28, mounted on frame H adjacent rollers 360. A pair of uprights 452 are joined to a parallelogram linkage and are connected to a transverse beam 454 to which are fastened an upper set of a plurality of L-shaped fingers 456. A similar set of oppositely disposed fingers 460 is similarly mounted on a beam 462 extending between uprights 463 with the upper plane of fingers 460 lying normally slightly below the plane of the upper surface of chain 401.

A sprocket 480, FIGURE 24, attached to shaft 412 drives sprocket chain 482 which in turn drives sprocket 484 mounted on shaft 485. Also mounted on this shaft 485 are two cams 486 and 487, FIGURES 26, 27 and 28. Cam 486 through arm 488 is attached to shaft 488a and is connected by gear train 489 to shaft 491 and by means of which shaft 491 is rocked. Levers 492 have one end fixed to shaft 491 and their other ends secured to uprights 452. Levers 493 are journalled on shaft 488a and have their opposite ends secured to uprights 452. Simultaneous movement of arms 492 and 493 cause the uprights to move vertically. Similar pairs of levers 492a and 493a extend from shafts 488a and 491 to uprights 463 to lift and lower the latter. However, each pair of levers 492a and 493a are journalled on shaft 491 and fixed to shaft 488a so that uprights 452 and 463 are moved in opposition to each other to open and close the space between fingers 456 and 460. When the fingers are opened, a stack of slices will be received between them, lifted from chains 401, and held when the fingers are closed. Then when the fingers separate, the stack will be replaced on chains 401. The timing of cam 486 is such that the stacks forwarded along chains 401 will be spaced apart substantially.

To ensure the proper timed delivery of the stacks, since clamp 450 merely releases a stack, holding the following line of stacks in check, stop pins 500 are provided which intermittently rise between chains 401 and momentarily arrest the travel of the stacks. These pins are carried by a beam 502 secured to arms 504 which are fixed to shaft 506. A second cam 487 on shaft 485 moves rocker arm 510 which is fixed to the end of shaft 506 and rocks this shaft to raise and lower pins 500 in timed sequence with a following arrangement of the stacks.

Delivery of the stacks to the wrapping machine is accomplished by means of the upper conveyor 600, FIGURES 5 and 23, in order to position the stacks for register with the pockets or cavities of the wrapping machine. A frame 602 mounted on frame H has shafts 603 and 604 journalled therein. Each shaft has a sprocket 606 adjacent the end of the shaft, and a pair of spaced sprocket chains 608. A gear 610 on shaft 400 of wrapping machine B meshes with gear 612 mounted on shaft 604 to drive chains 608.

Extending between and fastened to chains 608 are a plurality of sheet metal pushers 614 spaced from each other the exact distance required to place the stacks in proper register for machine B. The lower reach of chains 608 moves pushers 614 parallel to chains 401. As stacks, after being released from pins 500, are taken along by chains 401 until they reach a position below shaft 603. Chains 608 are driven at a slightly less linear speed than chains 401, so that the timing is such that each stack is first brought along until it abuts a pusher 614 and thus the leading edges of the stacks in adjacent paths are positively aligned with each other.

Chain 608 extend beyond the ends of chains 401, and beneath this extended portion are rails 620. Chains 401 carry the stacks partially onto rails 620, at which point the stacks temporarily stop as chains 401 turn downwardly. The next pusher then, in its advance, pushes the trailing edges of the stacks and squares them in their alignment with respect to their longitudinal travel. Rising from beneath rails 620 is a sheet of paper P which runs from the delivery ends of rails 620 across a shelf 700 into the wrapping machine B. Pushers 614 shove the stacks from rails 620 onto the sheet of paper in exact register for the wrapping machine.

In operation, the slicing and weighing machine A, delivers stacks of slices faster than all the stacks can be wrapped by machine B. However, machine A must be stopped intermittently to reload it with a new loaf of food to be cut into slices, and in addition some percentage of the stacks will be rejected as being under or over allowable weight. Furthermore, the single path output of machine A must be separated into two paths in order to feed the double row of package cavities in machine B.

In machine A, when a stack is weighed on the weighing platform, no signal is sent to the timing and memory device 110 if the weighed stack is of allowable weight. A first stroke of reciprocating conveyor G removes the stack from the weighing platform and advances it part way toward switching device C. A second stroke of conveyor G further advances the stack to a position where it is grasped between the fingers 36 and 38. As no signal has been received by memory device 110, switch 126 in the memory device will either hold the second and fourth valves open, note FIGURE 19, to hold the piston in cylinder 76 in center position, or closes the second valve and opens the third valve so that the piston is moved to the right. Successive stacks are accordingly deposited alternately on the second and right paths of the conveyor D. Should a stack be over or underweight, switch 134 activates solenoid 136, which causes the first and second valves to open, closes the third and fourth valves, and the piston is moved to the left to deposit the stack on the reject path.

Conveyor D advances the stacks over rollers 350 onto storage conveyor E. If the number of stacks on the conveyor is more than can be immediately received in conveyor E, the stacks will jam together in a line in each path, but without damage as each stack will stop easily as the nylon rollers 304 revolve under the stack. To assist in the reducing of the effect of the friction between a stack and the rollers 304, it has been found helpful to incline frame H from 1° to 3° so that conveyor F is slightly elevated above conveyor D.

Ideally, the apparatus should be inclined to a position just below that where the stacks would begin to roll downwardly by gravity. In such a position, the slightest contact of a stack with a preceding stack is sufficient to cause the stack to stop and for the rollers 304 to begin to roll as they pass beneath the stack.

In the reject path, the rejected stacks are manually removed by an operator, their weight corrected by adding to or taking from the stack, and the corrected stack then placed on either the center or righthand alternate paths.

From conveyor E the stacks in the center and alternate paths move over rollers 360 onto conveyor chains 401 of conveyor F, and between the fingers of clamping device 450. The clamping fingers 456 and 460 momentarily stop the leading stack in each path. This stoppage results in the aforesaid jamming of the stacks on storage conveyor E. In addition, this ensures that stacks are always available from the reserve held in storage to fill the wrapping machine. When released from clamping and escapement device 450, the two released stacks are again advanced on chains 401 until they are again stopped by pins 500 which both initially align and position the stacks on the chains so that they are received in proper spacing by the pushers 614. These pushers finally align and position the stacks and push the stacks onto traveling paper web P.

While the switching and storage conveyor composed of frame H supporting switching device C, and conveyors D, E and F, has been shown and described with reference to being powered by and timed with machines A and B, the invention includes the powering of the switching device and conveyors independent of associated feeding and receiving machines, in timed relation with respect thereto.

Having now described the means by which the objects of the invention are obtained,

We claim:

1. A conveying system comprising switching means for receiving articles from a single incoming path and shifting the articles to a position in alignment with one of a plurality of paths, a transfer conveyor for taking articles from said switching means, a roller storage conveyor for receiving articles from said transfer conveyor and being separated into said plurality of paths including a reject path and accepted paths, and article register means for aligning and positioning articles discharged from said storage conveyor, said register means including a chain conveyor for receiving articles from said storage conveyor, a clamping device for momentarily stopping the movement of articles coming from said storage conveyor to said chain conveyor, and pusher means located adjacent said chain conveyor for aligning the articles released from the clamping device and being forwarded by the chain conveyor.

2. A conveying system as in claim 1, said pusher means including pusher bars extending transversely across said accepted paths, and means for moving said bars parallel to the movement of and against the articles on said register means to align the articles moving in adjacent paths with one another.

3. A conveying system comprising switching means for receiving articles from a single incoming path and shifting the articles to a position in alignment with one of a plurality of paths, a transfer conveyor for taking articles from said switching means, a roller storage conveyor for receiving and advancing articles from said transfer conveyor and being separated into said plurality of paths including a reject path and accepted paths, and article register means for aligning and positioning articles discharged from said storage conveyor, said register means including a lower conveyor for receiving articles from said storage conveyor, an upper conveyor having its lower reach parallel to said lower conveyor, pusher bars on said upper conveyor for engaging the articles carried by said lower conveyor, and means for driving said upper and lower conveyors with the upper conveyor being driven at a less linear speed than said lower conveyor.

4. In combination, a switching drum having finger means for grasping and lifting an article from an incoming single path and moving the article parallel to the longitudinal axis of said drum into position for deposition upon one of a plurality of alternate paths, and a transfer conveyor extending at a right angle to said longitudinal axis for receiving an article lowered from said finger means onto one of said paths, said transfer conveyor being composed of a plurality of spaced belts between which said finger means pass while said article is removed from said finger means.

5. In combination with a food slice stacking and weighing machine and a wrapping machine having stack receiving cavities, a switching device for receiving weighed stacks from a single path coming from said stacking and weighing machine and for depositing each stack upon a transfer conveyor and on one of a plurality of following paths including a reject path on said transfer conveyor, storage conveyor means for receiving stacks from said transfer conveyor, and register conveyor means for receiving stacks from said storage conveyor means, said register conveyor means including a clamping device for momentarily stopping the movement of said stacks to hold some stacks in reserve upon said storage conveyor means, stop pins vertically movable through said register conveyor means for initially aligning the stacks in spaced order as they are advanced from said clamping device, and pusher bar means for placing the stacks forwarded from said stop pins into positions registered with the cavities in the wrapping machine.

6. In the combination of claim 5, further comprising means for driving said switching device, transfer conveyor and storage conveyor means from the stacking and weighing machine, and means for driving said register conveyor means from the wrapping machine.

7. A register conveyor for receiving articles from a storage conveyor and forwarding the articles in positions registered with receiving openings in a wrapping machine comprising a lower endless chain conveyor, a pair of clamping fingers forming an escapement clamping device for grasping an article and slightly lifting it from said chain conveyor to momentarily stop the movement of the articles on the storage conveyor while a preceding article is carried forward on said chain conveyor, stop pins movable through said chain conveyor for stopping articles coming from said clamping device, a pusher conveyor parallel to and above said chain conveyor for aligning articles released from said stop pins, and means for raising and lowering said stop pins in timing with said clamping device and said pusher conveyor.

References Cited in the file of this patent

UNITED STATES PATENTS

| | | |
|---|---|---|
| 1,592,795 | Webster | July 13, 1926 |
| 1,796,773 | Townsend | Mar. 17, 1931 |
| 1,871,832 | Absmeier | Aug. 16, 1932 |
| 1,904,613 | Braren | Apr. 18, 1933 |
| 2,219,827 | Kimball et al. | Oct. 29, 1940 |
| 2,554,038 | Lemmon | May 22, 1951 |
| 2,759,510 | Hartman | Aug. 21, 1956 |
| 2,759,603 | Bradley | Aug. 21, 1956 |
| 2,761,545 | Hoagland | Sept. 4, 1956 |
| 2,805,755 | Jones | Sept. 10, 1957 |
| 2,829,762 | Oswald | Apr. 8, 1958 |
| 2,849,116 | Fried | Aug. 26, 1958 |
| 2,938,626 | Dahms | May 31, 1960 |